ELECTRODE CONNECTIONS TO SEMICONDUCTIVE BODIES
Filed March 30, 1955
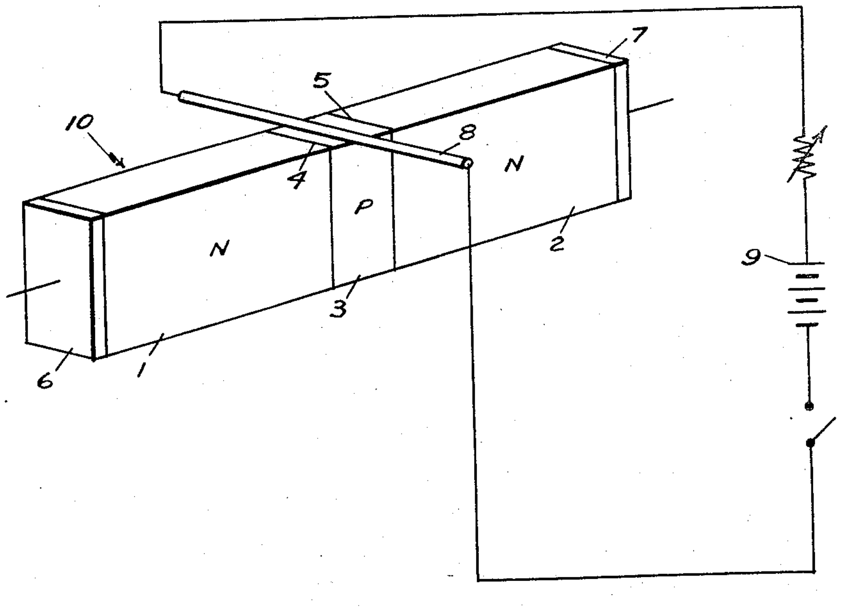
INVENTOR
GEORGE FREEDMAN
BY Elmer J. Gorn
ATTORNEY 2,948,836
Patented Aug. 9, 1960

2,948,836

ELECTRODE CONNECTIONS TO SEMI-CONDUCTIVE BODIES

George Freedman, Newton, Mass., assignor to Raytheon Company, a corporation of Massachusetts Filed Mar. 30, 1955, Ser. No. 497,853
7 Claims. (Cl. 317—235)

This invention relates generally to electrical translation devices of the type comprising a semiconductive body having conducting electrodes in contact therewith, and more particularly to an improved method of attaching electrodes to extremely narrow regions of the semiconductive body.

One form of semiconductor device comprises what is known in the art as a grown junction transistor. In this form, a body of semiconductive material, for example, germanium or silicon, is provided with a pair of zones having one type electrical conductivity characteristic, between which is sandwiched a zone of the body having a different type electrical conductivity characteristic, and electrical connections are made to the three zones. In accordance with recognized nomenclature, the connection to the intermediate zone is termed the base, and those to the outer two zones are termed the emitter and collector, respectively.

The performance characteristics of the device are dependent, among other things, upon the physical parameters of the intermediate zone. For example, in the case of devices operated as amplifiers, the upper limit for the frequency band of efficient operation is dependent upon the thickness of this zone, the limit becoming higher as the thickness decreases.

However, the construction of devices having such a thin zone involves the practical problem of establishing electrical connection to this zone. In the past, a bonding technique has been used wherein the electrode wire was placed in contact with the surface of the semiconductor within the confines of the narrow zone, and current passed through the wire and the semiconductor to effect a welded connection. This technique has not proved satisfactory since even when very fine wires are used, say of diameter comparable to the width of the zone, the melting of the point of contact tends to spread across the junctions between the different type material, thus shorting them with a consequent decrease in emitter efficiency. Also present is the possibility of the wire becoming displaced, as by mechanical shocks, so that the connection to the intermediate zone is broken, or an undesirable contact to the two adjacent zones is established. Further, the high temperature necessary to effect the connection often alters the conductivity type of the semiconductor material directly beneath the point of contact, a result particularly noticeable when the narrow zone is of N type material originally.

In accordance with the present invention, an improved method of connecting an electrode to the narrow base region is provided wherein an exceedingly fine wire may form a line contact with the semiconductor body, thus resulting in a mechanically stronger connection. The heat needed to form the connection is considerably lower than that of prior methods so that no undesirable changes occur in the electrical conductivity characteristics of the semiconductive body, and since neither the contact wire nor the surface of the semiconductor melts, no spreading across the junctions occurs, thus eliminating the short circuiting action of prior techniques.

The invention will be better understood as the following description proceeds, taken in conjunction with the accompanying drawing wherein the single figure is a diagrammatic representation of the manner of constructing the device of the present invention.

Referring now to the drawing, the device illustrated in the figure comprises a semiconductive body 10, for example, of germanium or silicon, having end zones 1 and 2 of one type electrical conductivity, and a third zone 3 of a different type electrical conductivity sandwiched between the end zones 1 and 2 and forming therewith junctions 4 and 5. The semiconductive body 10 advantageously is of single crystal structure and may be grown from a melt of semiconductive material which is alternately doped with desired type impurity materials to form the zones in a manner well known in the art. In the drawing, it may be assumed that end zones 1 and 2 have been grown from semiconductive material in which an N type impurity predominated, thus causing them to exhibit N type electrical conductivity characteristics, while the intermediate zone contains a predominance of P type impurity material thereby having P type electrical conductivity characteristics.

After the semiconductive body has been cut to size, lapped, and etched, substantially ohmic contacts 6 and 7, which may be, for example, metal platings, are attached to the N zones 1 and 2, respectively, these being termed emitter and collector, respectively. A third connection, termed the base, may then be made to the narrow P zone 3, the zone 3 having a thickness on the order of .001 inch. In accordance with the invention, this may be accomplished by stretching a fine wire 8 taut, parallel to P zone 3, and in contact with it. Wire 8 may be of exceedingly small diameter, for example, .00015 inch, and may be made of tungsten coated with an appropriate P type solder such as indium. It should be noted that the wire 8 may be of such small diameter because it is placed in line contact with the P zone, attempts to place such a wire in endwise contact with the zone being nearly impossible due to the fact that the wire cannot be made taut enough to form the connection.

With wire 8 in contacting relation to P zone 3, the solder coating may then be melted, as by passing a current through the wire from a source such as battery 9, thus effecting a sturdy contact to the semiconductive body. Since neither the semiconductor 10, nor the wire 8 is heated to a temperature sufficient to melt them, no spreading occurs across junctions 4 and 5 as is prevalent with prior methods, and since more area of the wire 8 is in contact with the semiconductor 10, a mechanically stronger bond is realized. In addition, because of the lower temperature used in accordance with the present invention, about 150° C. as compared to about 1,000° C. in previous methods, the danger of thermal damage to the semiconductive body is considerably reduced.

Although there has been described what is considered to be a preferred embodiment of the present invention, various adaptations and modifications thereof may be made without departing from the spirit and scope of the invention as defined in the appended claims.

What is claimed is:

1. An electrical translation device comprising a body of semiconductive material having two zones of the same electrical conductivity type between which is sandwiched another zone of different electrical conductivity type, electrical connections to each of said two zones, and a third connection to said other zone said third connection comprising a line contact electrode having a cross-sectional dimension smaller than the thickness of said other zone.

2. An electrical translation device comprising a body of semiconductive material having two zones of the same electrical conductivity type between which is sandwiched another zone of different electrical conductivity type, electrical connections to each of said two zones, and a third connection to said other zone said third connection comprising a wire having a cross-sectional dimension smaller than the thickness of said other zone and being in line contact with said other zone.

3. An electrical translation device according to claim 2 wherein said wire is a tungsten wire.

4. An electrical translation device comprising a body of semiconductive material having two zones of the same electrical conductivity type between which is sandwiched another zone having a different electrical conductivity type, electrical connections to each of said two zones, and a third connection to said other zone said third connection comprising a wire having a cross-sectional dimension smaller than the thickness of said other zone and being in contact with said other zone and lying parallel to and wholly within the boundaries of said other zone.

5. The method of attaching an electrode to a semiconductive body said method comprising placing a wire in line contact with said body said wire being coated with solder which is of the same conductivity type as the portion of said body with which it is in contact, and passing current through said wire sufficient to heat said wire and said solder to the melting point of said solder whereby said wire is fused to said body.

6. The method of attaching an electrode to a semiconductive body said method comprising placing a wire in line contact with said body said wire being coated with solder which is of the same conductivity type as the portion of said body with which it is in contact, and maintaining said wire taut while passing current therethrough sufficient to heat said wire and said solder to the melting point of said solder whereby said wire is fused to said body.

7. An electrical translation device comprising a body of semiconductive material having at least two zones of different electrical conductivity type, said body further having a third zone of electrical conductivity type different from said two zones intermediate said two zones, electrical connections to each of said two zones, and an electrical connection to said third zone, said third connection comprising an electrode having a cross-sectional dimension smaller than the thickness of said third zone and being in extended surface area contact with said third zone.

References Cited in the file of this patent

UNITED STATES PATENTS

| | | |
|---|---|---|
| 2,381,025 | Addink | May 29, 1941 |
| 2,524,035 | Bardeen et al. | Oct. 3, 1950 |
| 2,567,970 | Scaff et al. | Sept. 18, 1951 |
| 2,623,102 | Shockley | Dec. 23, 1952 |
| 2,651,009 | Meyer | Sept. 1, 1953 |
| 2,654,059 | Shockley | Sept. 29, 1953 |
| 2,721,965 | Hall | Oct. 25, 1955 |
| 2,728,034 | Kurshan | Dec. 20, 1955 |
| 2,748,235 | Wallace | May 29, 1956 |
| 2,777,101 | Cohen | Jan. 8, 1957 |
| 2,813,233 | Shockley | Nov. 12, 1957 |
| 2,817,613 | Mueller | Dec. 24, 1957 |
| 2,845,372 | Jones et al. | July 29, 1958 |
| 2,860,291 | Karnavas | Nov. 11, 1958 |